Sept. 29, 1964  W. J. FRANKLIN ETAL  3,150,731
AIR CUSHION VEHICLE CONSTRUCTION INCLUDING CONTROL VALVES
Filed March 25, 1960  2 Sheets-Sheet 1
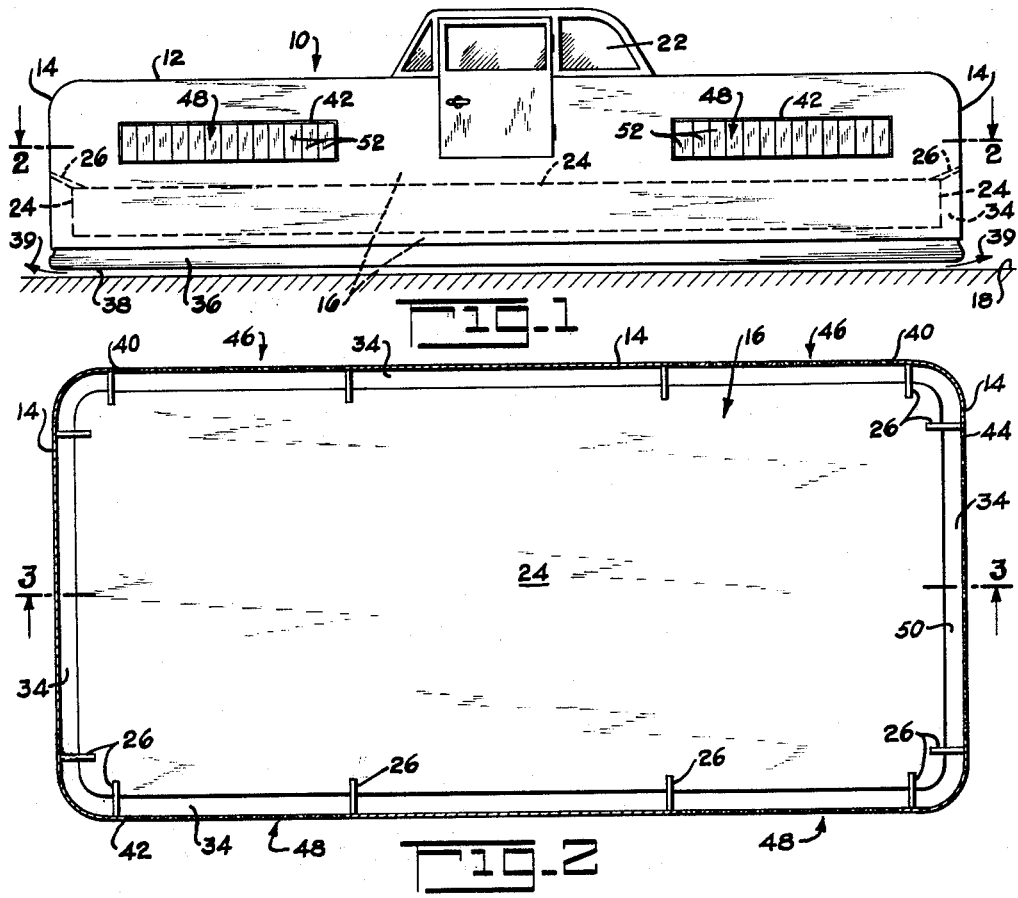
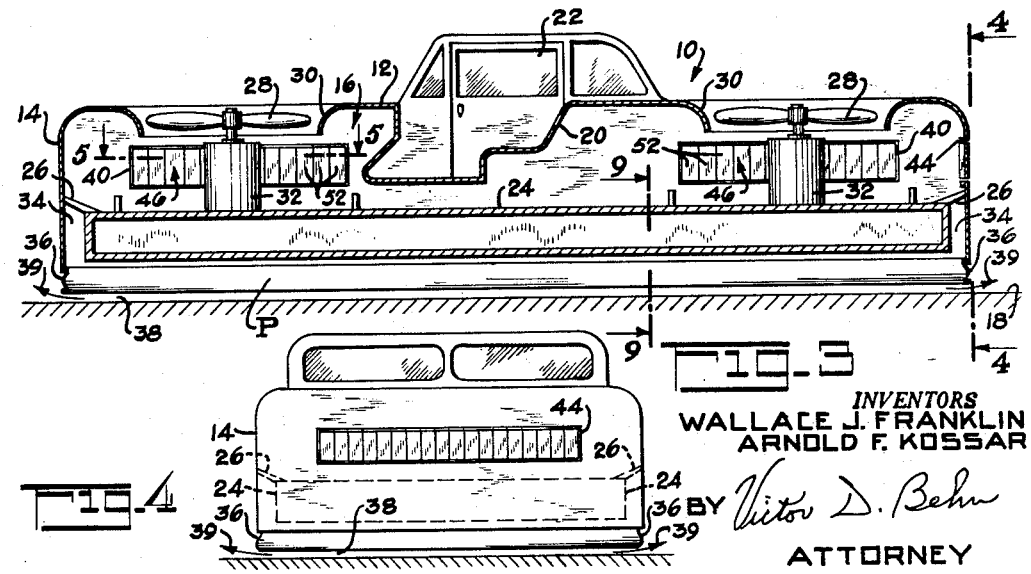
INVENTORS
WALLACE J. FRANKLIN
ARNOLD F. KOSSAR
BY
ATTORNEY

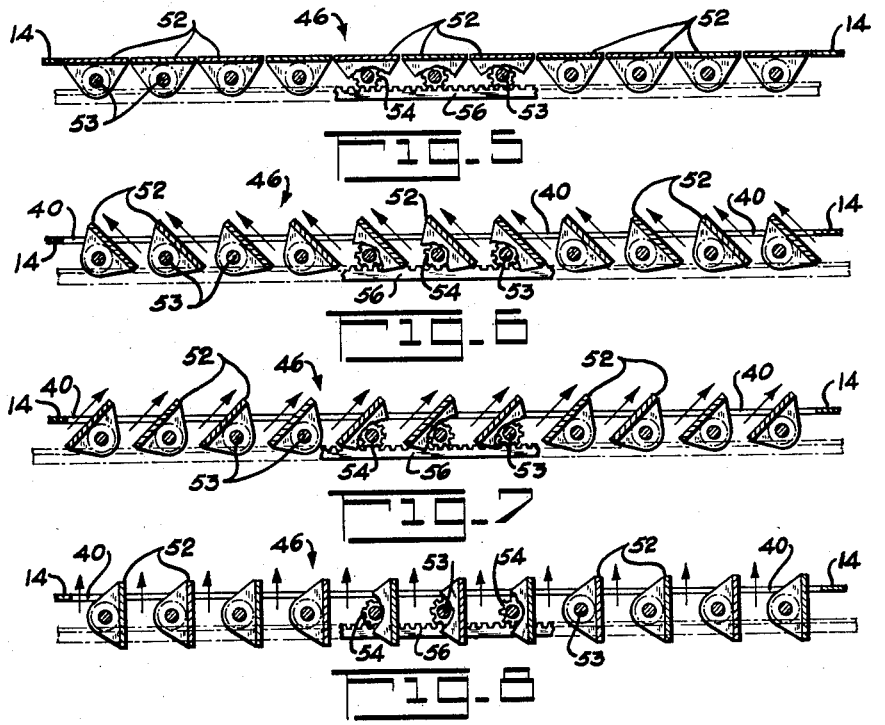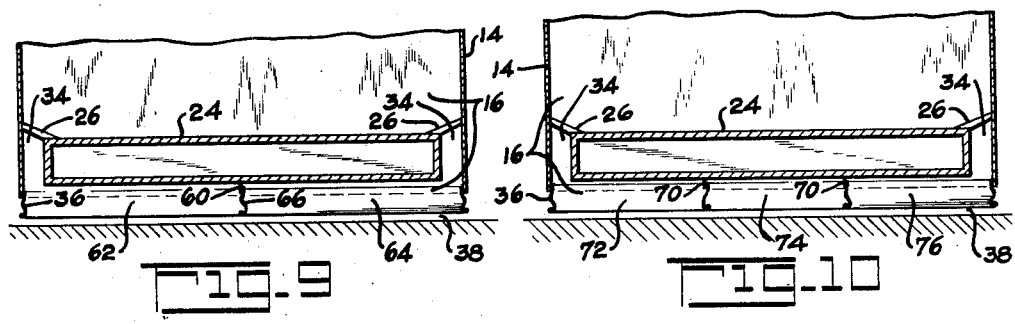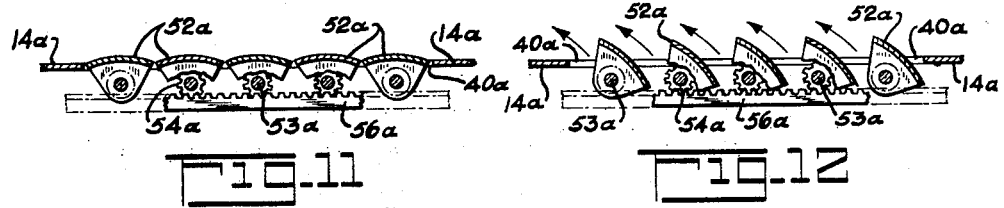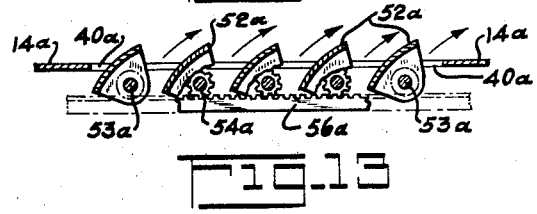

United States Patent Office 3,150,731
Patented Sept. 29, 1964

3,150,731
AIR CUSHION VEHICLE CONSTRUCTION
INCLUDING CONTROL VALVES
Wallace J. Franklin, New York, N.Y., and Arnold F.
Kossar, Fair Lawn, N.J., assignors to Curtiss-Wright
Corporation, a corporation of Delaware
Filed Mar. 25, 1960, Ser. No. 17,692
7 Claims. (Cl. 180—7)

This invention relates to vehicles and is particularly directed to air borne ground vehicles which are supported by a cushion of air or other fluid between the vehicle and the ground such that at least a major portion of the lift of the vehicle is obtained from the pressure of the air between the vehicle and the ground.

Vehicles of this type are capable of operating over various surfaces including water and the term "air borne ground vehicle" as used herein is intended to be broad enough to cover all such vehicles regardless of the type of surface or surfaces over which the vehicle is operated.

An object of the invention comprises the provision of an improved propulsion system for air borne ground vehicles.

A still further object of the invention resides in the provision of an improved propulsion system for air borne ground vehicles, said propulsion system providing for vehicle propulsion in any direction, forward, reverse and sideways and for maneuvering and turning of the vehicle.

Another object of the invention comprises a novel propulsion and lift arrangement for air borne ground vehicles for minimizing the air flow requirements of the vehicles. It is also an object of the invention to provide such an air borne ground vehicle with improved means for maintaining the trim of the vehicle.

In accordance with the invention the air borne ground vehicle comprises a housing having a depending peripheral wall forming a chamber having an open bottom. Means, such as an engine driven fan, is provided for supplying air under pressure to said chamber for escape therefrom under the bottom edge of said housing peripheral wall. With this arrangement the pressure of the air between the housing and ground provides the vehicle with lift, the magnitude of the air pressure and resulting lift being sufficient to raise the vehicle off the ground. In addition, the peripheral wall of the vehicle housing is provided with one or more openings through which air discharges from the chamber to provide the vehicle with a horizontal thrust force.

Each such peripheral wall opening is provided with selectively operable valve means such that each said valve means may be moved to various positions including a first position in which the opening is closed, a second position in which air discharging through said opening from the vehicle chamber has a horizontal velocity component in one direction along the adjacent peripheral wall of the housing, a third position in which air discharges through the opening from the chamber has a horizontal velocity component in the opposite direction and said valve means also may have a fourth position in which air discharging through said opening has a direction which is perpendicular to said aforementioned two directions. In addition, the valve means may be positioned in various intermediate positions and may be moved from its first or closed position directly to either of its second and third positions in order that the direction of the thrust may be reversed without producing thrusts lateral to said direction during the reversal.

A further feature of the invention resides in the addition of a horizontal partition across said housing chamber below the point of air supply to said chamber. This partition terminates short of the peripheral wall of the chamber so as to leave a gap between substantially the entire peripheral edge of said partition and the peripheral wall. The magnitude of this gap, however, preferably is sufficiently small so that as a result of its flow resistance a substantially higher pressure is maintained in the housing chamber above said partition as compared with the pressure below said partition. The aforementioned openings in the housing peripheral wall preferably are located above said partition whereby, compared with the pressure required for vehicle lift, a higher air pressure is available for discharge through said openings for providing the vehicle with horizontal thrust forces. In addition this feature reduces the air flow requirements, since a small quantity of the higher pressure air flowing through the peripheral gap will maintain the lower underneath pressure required to lift the vehicle.

Still another feature of the invention resides in the provision of one or more auxiliary vertical walls or curtains dividing said chamber into a plurality of compartments to help maintain the horizontal trim of the vehicle. Each such vertical wall preferably has a flexible skirt along its lower edge with the lower edge of said skirt lying approximately in the plane of the lower edge of a skirt depending from the bottom of the housing peripheral wall. If the housing chamber has the aforementioned horizontal partition with its flow restricting gap, then each such auxiliary vertical wall has its upper edge in engagement with the lower side of said horizontal partition so as to divide only the lower portion of the housing chamber into said compartments. This feature also serves to reduce the air flow requirements.

Other objects of the invention will become apparent upon reading the annexed detail description in connection with the drawing in which:

FIG. 1 is a side view of an air borne ground vehicle embodying the invention;

FIG. 2 is a horizontal sectional view through the vehicle and taken along line 2—2 of FIG. 1;

FIG. 3 is a longitudinal sectional view through the vehicle and taken along line 3—3 of FIG. 2;

FIG. 4 is a reduced-scale rear end view of the vehicle;

FIG. 5 is a detail view of the valve means for controlling one of the openings in the peripheral wall of the vehicle housing;

FIGS. 6, 7 and 8 are detail views similar to FIG. 5 but showing the valve means in different positions of adjustment;

FIG. 9 is a sectional view taken along line 9—9 of FIG. 3;

FIG. 10 is a view similar to FIG. 9 but illustrating a modified construction; and FIGS. 11, 12 and 13 are views similar to FIGS. 5, 6 and 7 respectively but illustrating a further modification of the invention.

Referring to the drawing, an air borne ground vehicle 10 comprises a housing or shell 12 having a depending peripheral wall 14 forming a chamber 16 within said housing. The lower side of the chamber 16 adjacent to the ground or other support surface 18 is open to said surface. The housing 12 may also have suitable dividing wall structure 20 to form a compartment 22 for the vehicle operator as well as for passengers and/or cargo. A rigid supporting structure 24 preferably is disposed horizontally across the chamber 16, the housing 12 being connected to said rigid structure 24 by brackets 26 for support thereby.

One or more fans or blowers 28 provided for supplying air under pressure into the chamber 16. As shown each fan 28 is supported with its axis vertical in a vertical inlet passage 30 in the housing 12 for blowing air from the surrounding atmosphere downwardly into the chamber 16 above the horizontal structure 24. Two fans 28 are shown in the drawing and each said fan is driven by its own engine 32, said engines being mounted on the rigid support structure 24. Obviously, however, means may be provided for driving all the fans 28 from a single engine. Also the vehicle may be provided with but one fan 28 or any plural number of fans instead of the two fans illustrated, and the axis or axes of the fans may be horizontal or inclined instead of vertical as illustrated.

The horizontal structure 24 extends across the chamber 16 to form a horizontal partition across said chamber, said structure, however, terminates short of the peripheral wall 14 to leave a gap 34 between the peripheral edge of said structure or partition 24 and the wall 14. Also a flexible skirt 36 extends around and is connected to the lower edge of the peripheral wall 14 so as to depend therefrom toward the ground 18.

When the vehicle 10 is shut down it rests on the ground 18. When, however, the fans 28 are operated to pressurize the chamber 16, pressure builds up in the chamber 16 to the point at which sufficient lift force is provided to raise the vehicle off the ground whereupon air supplied to the chamber 16 escapes under the skirt 36 through the clearance 38 between said skirt and the ground. This air leakage is indicated by the arrows 39. The vehicle 10 rises to a height above the ground 18 such that the lift force provided by the air within the chamber 16, between said chamber and the ground, balances the weight of the vehicle whereupon the vehicle in effect floats on this cushion of air. A small amount of vehicle lift is also provided by the small upward vertical thrust produced by the fans 28. When the vehicle is thus raised off the ground so that as stated it floats on a cushion of air the resistance to horizontal motion of the vehicle is reduced to a minimum and only relatively small horizontal thrust forces are required for vehicle propulsion over the ground.

In order to provide the vehicle with a horizontal propulsion system the chamber 16 has one or more openings 40 in the right side of the vehicle peripheral wall 14. Any number of such side openings 40 may be provided. Preferably, however, at least two such openings are provided one adjacent to the front and the other adjacent to the rear of the vehicle to facilitate maneuvering of the vehicle. The opening or openings 40 in the right side of the vehicle extend a substantial horizontal distance along the peripheral wall 14 in order that the opening is sufficiently large so that substantial horizontal thrust may be obtained therefrom. Similarly openings 42 are provided in the left side of said peripheral wall. In addition the rear portion of the peripheral wall 14 has an opening 44 for the chamber 16. Like the side openings 40 and 42 the rear opening 44 also extends a substantial horizontal distance along the peripheral wall 14.

Valve means 46, 48 and 50 are provided for controlling the peripheral wall openings 40, 42 and 44 respectively. The details of the valve means 46 are shown in FIGS. 5, 6, 7 and 8. As there shown the valve means 46 consists of a plurality of slat-like members 52 which are mounted in side-by-side relation on the peripheral wall 14 so as to extend substantially vertically across the opening 40. Each slat-like member 52 is mounted for pivotal movement about the axis of a vertical pivot shaft 53. Each slat-like member 52 has a pinion 54 secured to its pivot shaft 53 with each such pinion being disposed in mesh with a rack 56. The rack extends horizontally along the wall 14 and is horizontally movable, for example, by the vehicle operator, to swing the slat members about their pivot axes. Separately operable racks 56 preferably are provided for controlling the slat-like members 52 of each of the openings 40.

The slat members 52 may be positioned as in FIG. 5 in which their adjacent edges substantially abut so to close the opening 40. If the rack 56 is now moved to the left, as viewed in FIGS. 5–8, the slat members 52 are swung to their partially open positions of FIG. 6. In this position the faces of the slat-like members make an angle of approximately 45° with the peripheral wall 14 such that air discharging through the opening 40 from the pressurized chamber 14 has a horizontal forward component. The slat members 52 can also be moved from their positions of FIG. 5 direct to their partially open position of FIG. 7 by moving the rack to the right from its position of FIG. 5. In this position in FIG. 7 the faces of the slat-like members 52 are again inclined at approximately 45° to the peripheral wall 14 but are oppositely inclined from their positions of FIG. 6 so that air now discharging through the opening 40 has a horizontal rearward component. In addition by appropriate movement of the rack 56 the slat-like members 52 can be opened wide to their position of FIG. 8. In this latter position the slat-like members 52 are discharging air through the opening 40 which has no horizontal component forward or rearward parallel to the peripheral wall 14. The slat-like members 52 obviously are also selectively movable to positions intermediate those illustrated in FIGS. 5, 6, 7 and 8.

The valve means 48 and 50 and operating means therefore are similar to the valve means 46 just described so that no detailed description of the valve means 48 and 50 is considered necessary. Thus the valve means 48 and 50 like the valve means 46, consist of a plurality of substantially vertical side-by-side slat-like members 52 which are movable by the selectively operable rack 56 to positions corresponding to the positions of FIGS. 5, 6, 7 and 8 as well as to intermediate positions. Thus for each of the valve means 46, 48 and 50 its slat-like members 52 may be moved to a first position (FIG. 5) to close its opening in the peripheral wall 14, to a second position (FIG. 6) in which said opening is open and air discharging therethrough has a horizontal component in one direction along the adjacent portion of peripheral wall, to a third position (FIG. 7) in which its said opening is open and the air discharging therethrough has a horizontal component in the opposite direction along the adjacent portion of the peripheral wall and to a fourth position (FIG. 8) in which said opening is open and air discharges therethrough in a direction substantially normal to said aforementioned two directions. In the case of the two side openings 42, as in the case of the two openings 40, separately operable racks 56 are preferably provided for controlling each of the openings 42.

With the aforedescribed structure of the valve means forward thrust can be provided the vehicle by moving the valve means 46 and 48 to positions as in FIG. 7 in which their slat-like members 52 are inclined to the adjacent portion of the peripheral wall 14 so that the air discharging therethrough from the chamber 16 has a horizontal rearward component. If additional forward thrust is desired the rear valve means 50 is opened to the position in which its slat-like members are opened wide as in FIG. 8. Similarly, rearward thrust may be obtained by moving the valve means 46 and 48 to positions as in FIG. 6 in which their slat-like members 52 are inclined to the adjacent portion of the peripheral wall 14 so that air discharging therethrough from the chamber 16 now has a forward component. This rearward thrust may be used for actual rearward motion of the vehicle or simply for braking forward motion of the vehicle. For this latter purpose it is important that the slat-like members 52 for the side openings 40 and 42 be movable, as illustrated, from their forward thrust positions (FIG. 7) directly to their rearward thrust positions (FIG. 6) without going through the side thrust position of FIG. 8.

Thrust for turning and/or otherwise maneuvering the vehicle may be obtained by various combinations of open or closed positions of the two valve means 46, the two valve means 48 and the valve means 50. For example, if both valve means 46 are opened wide while the valve means 48 and 50 are closed the vehicle is provided with side thrust. This side thrust can be used, for example, to balance centrifugal force when the vehicle is traveling around a turn or it can be used simply for moving the vehicle sideways. The rear valve means 50 can be opened to provide straight forward thrust or said valve means can be partially opened to provide thrust which is inclined to the longitudinal axis of the vehicle. Also one of the side openings (40 for example) may be opened and the other opening on the same side closed for turning the vehicle about its vertical axis.

The peripheral wall 14 may also have an opening (not shown) at the forward end of the vehicle together with suitable valve means, such as the valve means 50, for example, in order to provide additional rearward thrust.

If the gap 34 between the partition 24 and the peripheral wall 14 is sufficiently large or if there are sufficiently large openings through the partition 24 then the pressure in the chamber 16 will be the same above and below said partition. Preferably, however, the partition 24 is imperforate and the gap 34 is made sufficiently small so that there is substantial resistance to air flow in the chamber 16 from above the partition 24 to below the partition. For example, for an air chamber 16 which is approximately 12 feet by 8 feet in horizontal section the width of the gap 34 may be of the order of about two inches. As a result, the air pressure in the chamber 16 will be substantially greater above the partition than below it. With this arrangement the major portion of the vehicle lift is provided by the lower pressure in the chamber 16 below the partition 24 as a result of the action of this lower pressure against the under side of said partition. The higher pressure in the chamber 16 above the partition 24 acts upwardly against the top wall of the chamber 16 but this force is largely balanced by the downward force on the upper side of the partition 24.

The provision of a substantially higher pressure in the portion of the chamber 16 above the partition 24 has the advantage that this higher pressure is then available for discharging air through the openings 40, 42 and 44 for propulsion or maneuvering of the vehicle. At the same time the relatively low pressure in the chamber 16 below the partition 24 provides the major portion of the vehicle lift. The use of this lower pressure for vehicle lift reduces the leakage of air flow through the clearance 38 under the vehicle skirt 36 as compared with the leakage which would take place if the higher pressure were also used for lift purposes, thereby reducing the air flow capacity required of the fans 28.

In order to better control the trim of the vehicle, the chamber 16 is provided with a vertical auxiliary wall or curtain 60 which runs in a fore and aft direction to divide the chamber 16 into two compartments 62 and 64. If, as illustrated, there is substantial resistance in the chamber 16 to air flow from above the partition 24 to below said partition through the small gap 34, then the curtain 60 need only be provided in the chamber 16 below said partition, said curtain being secured to the underside of said partition. On the other hand if there were little or no flow resistance across the partition 24 then the pressure in the chamber 16 would be substantially equal above and below said partition whereupon the curtain 60, to be effective, would have to extend substantially the full height as well as length of the chamber 16.

The curtain 60 has a flexible skirt 66 secured along its lower edge so that the lower edge of the skirt 66 lies approximately in the plane of the lower half of the skirt 36.

With the curtain 60, if the vehicle 10 should tilt relative to the horizontal so as to lower the side portion of the skirt 36 adjacent to the compartment 62 then the pressure within the compartment 62 will increase while the pressure in the compartment 64 will decrease. This relative pressure change in the compartments 62 and 64 will tend to right the vehicle 10. In this way the curtain 60 functions to maintain the trim of the vehicle and also be minimize the escape of air out under the vehicle skirt from the chamber 16.

If desired a plurality of fore and aft auxiliary walls or curtains may be provided to divide the chamber 16 into a plurality of compartments as shown in FIG. 10. As there shown a pair of curtains 70 are provided to divide the lower portion of the chamber 16 into three compartments 72, 74 and 76. The division of the chamber 16 into a plurality of such compartments serves to further reduce flow of air out under the vehicle skirt particularly when the vehicle tilts with respect to the horizontal. One or more similar curtains (not shown) may also be provided so as to extend laterally across the vehicle.

In FIGS. 5–8 the slat-like members 52 have been illustrated as having a flat construction. The slat-like members 52 particularly for the side openings 40 and 42 may, however, have an arcuate shape when viewed in horizontal section and as illustrated in FIG. 11. For ease of understanding the parts of FIG. 11 corresponding to the parts of FIG. 5 have been designated by the same reference numerals but with a subscript $a$ added thereto.

In FIG. 11 the slat-like members $52a$ are concave when viewed from inside the vehicle. When these slat-like members $52a$ are partially opened, as indicated by their dot and dash line positions in FIG. 11, the curvature of these slot-like members serves to turn the air discharging from the chamber $16a$ outwardly between in a direction substantially parallel with the adjacent portion of the vehicle peripheral wall $14a$. Hence, this curvature of the slat-like members $52a$ serves to increase the forward or reverse thrust obtained when said members are partially opened as illustrated.

Obviously, the slat-like members controlling the openings in the peripheral wall 14 may if desired be provided with a streamlined profile in horizontal section.

It is also within the scope of the invention to pressurize the chamber 16 with a gas other than simply air. For example, instead of the engine driven air fans 28, the vehicle could be provided with turbojet engines arranged to discharge their exhaust into the chamber 16. Accordingly, the term air as used herein is intended to be broad enough to cover such other gases. Obviously, if a partition 24 is used the turbojet exhaust gases or other gases would be discharged into the chamber 16 above said partition.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. An air borne ground vehicle comprising a housing having a depending peripheral wall having front, rear and two side wall portions to form a chamber having an open ground-facing bottom side, the lower edge of said peripheral wall forming the periphery of the open bottom of said chamber such that said open bottom has an area approximately equal to the cross-sectional area of the outer periphery of the vehicle and, when the vehicle is at rest, said lower edge of the peripheral wall being disposed substantially in contact with the ground to close the bottom side of said chamber; a generally horizontal partition disposed across said chamber adjacent to but spaced upwardly from its open bottom, said partition terminating short of the peripheral wall of said chamber to leave a narrow elongate slot therebetween forming a passage connecting the upper side of said partition with its underside; means for supplying air under pressure into said chamber above said partition so that said air flows down from said chamber through said slot to the underside of said partition from whence it escapes in a generally horizontal direction under the bottom edge of said peripheral wall, said slot being sufficiently small in cross-section to air flow therethrough so that, when the vehicle is supported above the ground for horizontal propulsion thereover by air pressure under the partition, the flow resistance offered by said slot to air flow therethrough is sufficiently high so that a substantially higher above-atmospheric air pressure is maintained in said chamber above said partition as compared to the above-atmospheric air pressure in said chamber below said partition and said air flow providing a pressure between the vehicle and the ground sufficient to raise the vehicle off the ground to an extent such that a small clearance is provided between the vehicle peripheral wall and the ground and such that the pressure between the vehicle and the ground provides an air cushion therebetween which provides the main force supporting the vehicle off the ground, said peripheral wall having at least one controllable opening for communication with said chamber above said partition such that when open the air discharging through each opening has a horizontal velocity component to provide the vehicle with horizontal thrust; and valve means operable to control each said peripheral wall opening.

2. An air borne ground vehicle as claimed in claim 1 and in which said peripheral wall has at least one such controllable opening in each of its two peripheral side wall portions and in which the valve means for each said opening includes a plurality of side-by-side valve elements movable to a position such that the air discharging through the associated opening has a component parallel to the adjacent side wall portion.

3. An air borne ground vehicle as claimed in claim 1 in which said valve means comprises a plurality of side-by-side substantially vertical slat-like members each pivotally supported on a substantially vertical axis; and means operatively connected to said slat-like members and selectively operable for moving said members to a first position in which said peripheral wall opening is closed, to a second position in which said opening is open and said members direct the air discharging therethrough so that said air discharge has a horizontal component in one direction along the adjacent portion of said peripheral wall and to a third position in which said opening is open but said members direct the air discharging therethrough so that said air discharge has a horizontal component in the opposite direction along the adjacent portion of the peripheral wall.

4. An air borne ground vehicle as claimed in claim 3 in which said peripheral wall has at least three such peripheral wall openings and associated valve means, two of said openings being disposed in the opposite side wall portions of said peripheral wall and a third opening being disposed in the rear portion of said peripheral wall.

5. An air borne ground vehicle as claimed in claim 3 in which said peripheral wall has two such peripheral wall openings in both side portions of said peripheral wall with the two openings in each peripheral wall side portion being disposed adjacent to opposite ends of the vehicle.

6. An air borne ground vehicle as claimed in claim 3 in which each of said slat-like members is arcuate in horizontal section such that said members are convex when viewed from outside said vehicle chamber and in which the pivot axis of each said arcuate slat-like member is spaced from and is disposed between the edges of said member.

7. An air borne ground vehicle as claimed in claim 1 and including a flexible skirt extending around and connected to the lower edge of said peripheral wall; and a vertical wall disposed across said chamber below said horizontal partition with the upper edge of said vertical wall abutting said partition, and a flexible skirt extending along the lower edge of said vertical wall with the lower edge of said latter flexible skirt lying substantially in the plane of said peripheral wall flexible skirt.

References Cited in the file of this patent

UNITED STATES PATENTS

| | | |
|---|---|---|
| 1,123,589 | Porter | Jan. 5, 1915 |
| 2,461,435 | Neumann et al. | Feb. 8, 1949 |
| 2,838,257 | Wibault | June 10, 1958 |
| 2,968,453 | Bright | Jan. 17, 1961 |
| 3,066,753 | Hurley et al. | Dec. 4, 1962 |
| 3,090,455 | Crowley | May 21, 1963 |

FOREIGN PATENTS

| | | |
|---|---|---|
| 219,133 | Australia | Nov. 24, 1958 |

OTHER REFERENCES

Publication: "Remarks on Ground-Effect Machines"; G. D. Boehler; presented Sept. 25, 1958 at the Fifth Annual Western Forum of the American Helicopter Society; pages 9 and 14 relied on.

Publication: "Aviation Week"; January 12, 1959; pages 74 and 75.

Publication: "Aviation Week"; July 6, 1959; pages 115 and 116.

Publication: "Popular Science Monthly"; July 1959; pages 51, 52, 53, 54, 55, 195.